No. 752,091. PATENTED FEB. 16, 1904.
O. MILLER & P. KUNZINGER.
FISHING TACKLE.
APPLICATION FILED APR. 28, 1903.
NO MODEL.
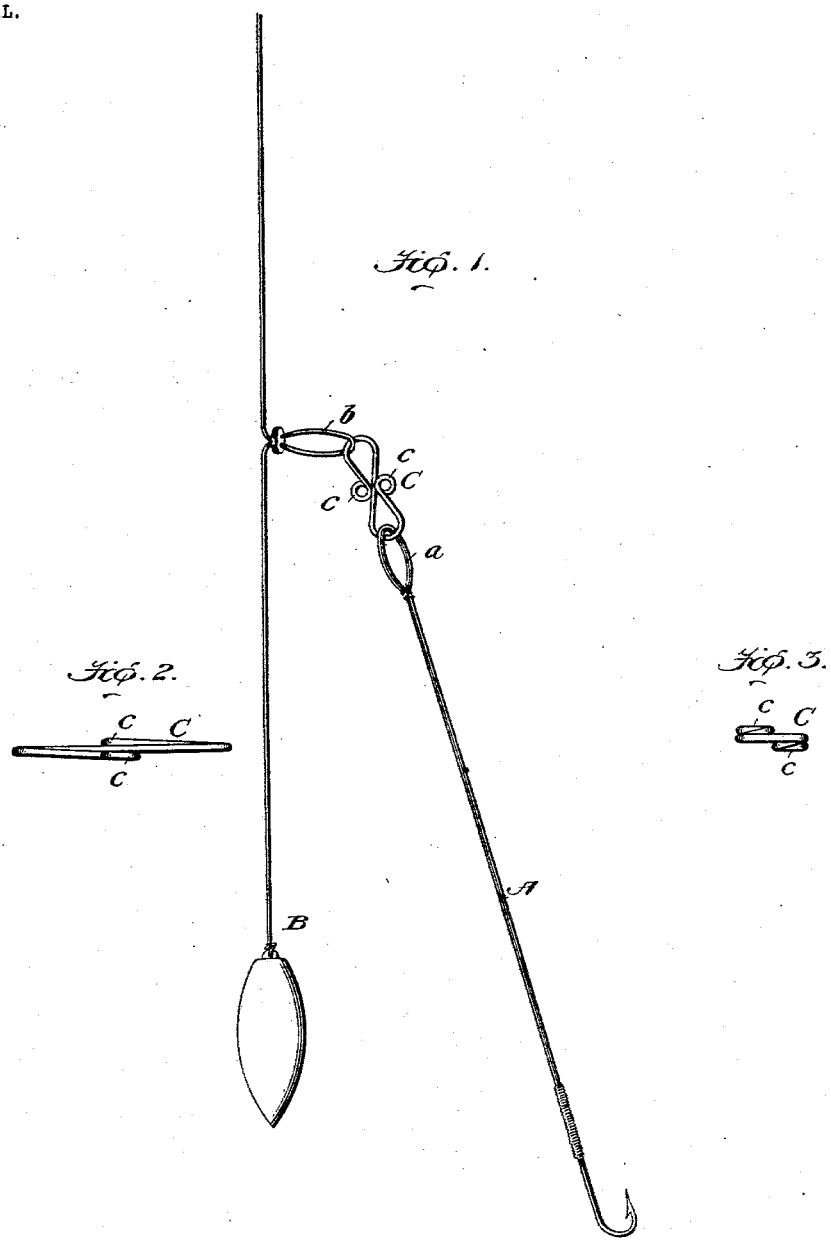

No. 752,091. Patented February 16, 1904.

UNITED STATES PATENT OFFICE.

OTTO MILLER AND PHILIP KUNZINGER, OF NEW YORK, N. Y.

FISHING-TACKLE.

SPECIFICATION forming part of Letters Patent No. 752,091, dated February 16, 1904.

Application filed April 28, 1903. Serial No. 154,662. (No model.)

*To all whom it may concern:*

Be it known that we, OTTO MILLER and PHILIP KUNZINGER, citizens of the United States, and residents of the borough of Brooklyn, city of New York, in the county of Kings and State of New York, have invented a new and useful Improvement in Fishing-Tackle, of which the following is a specification.

Our invention relates to an improvement in fishing-tackle.

Hitherto it has been the general practice to loop the leader and snell together; but the objection to this method is that a tight knot is formed, resulting from the pulling and drawing strain upon the line and also in consequence of the swelling due to the line getting soaked, and when it is desired to separate them it is a very difficult matter, often necessitating cutting the snell, which it is always desirable to retain intact for further use.

The object of our invention is to provide a connecting-hook which will hook into the loop formed in the snell on the one hand and into the loop formed in the line at the other end, thus affording a quick and at the same time secure mode of fastening or unfastening the snell.

With the foregoing objects in view our invention comprises a double hook, preferably made of wire, in combination with a snell and leader, into the loops of which the hooks are detachably connected; and it further consists in certain novel features of construction and combinations of parts, which will be hereinafter described, and pointed out in the claims.

In the accompanying drawings, Figure 1 is a plan view of our improved tackle. Fig. 2 is a side elevation of the double hook, and Fig. 3 is an end elevation of this double hook.

The letter A represents the snell, provided with a loop *a*.

B is the line or leader provided with a loop *b*.

C indicates the double hook, composed, preferably, of a single piece of wire bent into S shape, with the ends *c* preferably bent around to form the rounded heads, as indicated in the drawings, and slightly overlapped to prevent accidental unhooking.

In practice it is simply necessary to hook the ends of hook C into the loops *a* and *b*, requiring no knotting or looping of the snell or line, as heretofore, and making the attachment quick and simple and substantial, while at the same time admitting of the snell being easily detached when desired by simply springing the hook to permit its loop *a* to escape. The line may be detached in similar fashion. In this way the cutting or breaking of either snell or line is rendered unnecessary and much time, inconvenience, and loss of good material is saved, all of which are important considerations to a sportsman. A further and very useful function of this double hook C is that of a sinker for the hook, making it unnecessary to attach any other form of sinker.

Having fully described our invention, what we claim as new, and desire to secure by Letters Patent, is—

1. The combination with the snell and line of a fishing-tackle, each of which has loops formed therein, of a double S-shaped hook, the ends of which are in contact with the intermediate portion of the hook in different parallel planes whereby to close the hooks and prevent accidental unhooking.

2. The combination with the snell and line of a fishing-tackle, each of which has loops formed therein, of a double S-shaped hook, the ends of which are in contact with the intermediate portion of the hook in different parallel planes, whereby to close the hooks and prevent accidental unhooking, said ends terminating in eyes.

In testimony whereof we have signed this specification in the presence of two subscribing witnesses.

OTTO MILLER.
PHILIP KUNZINGER.

Witnesses:
ALBERT HUTTON,
MAX CORIN.